United States Patent

[11] 3,572,460

| [72] | Inventor | Bodo Berlich |
| | | Offenbach, Germany |
| [21] | Appl. No. | 836,077 |
| [22] | Filed | June 24, 1969 |
| [45] | Patented | Mar. 30, 1971 |
| [73] | Assignee | Danfoss A/S |
| | | Nordborg, Denmark |

[54] HYDROSTATIC STEERING SYSTEM
5 Claims, 5 Drawing Figs.

[52] U.S. Cl.......................................... 180/79.2,
60/52
[51] Int. Cl............................................ B62d 5/06
[50] Field of Search.......................... 180/79.2,
79.2 (C); 60/52 (S), 52

[56] References Cited
UNITED STATES PATENTS

| 2,020,951 | 11/1935 | Lemon.......................... | 60/52(S) |
| 2,783,849 | 3/1957 | Armington et al............ | 180/79.2(C) |
| 3,482,398 | 12/1969 | Christensen.................. | 180/79.2 |

*Primary Examiner*—Benjamin Hersh
*Assistant Examiner*—John A. Pekar
*Attorney*—Wayne B. Easton ABSTRACT: The invention relates to a hydrostatic-steering system having two or more motors for the power steering of two or more wheels, or two or more pairs of wheels. The motors are arranged in parallel in a hydraulic circuit and a metering type control device operated by a steering wheel is used for controlling the distribution pressurized hydraulic fluid to the motors. A fluid stream quantity divider is utilized to supply equal quantities of pressurized fluid to the motors. Each of the motors has valve means associated therewith having two or three operative positions including a neutral or bypass position. The other operative positions facilitate the operation of a motor such that the turning of the steering wheel in one direction effects the operation of the motor in a selected one of two possible directions. With this arrangement, for example, it is possible to have the front wheels of a vehicle turn in one direction and the rear wheels of the vehicle turn in either selected direction as desired.

Patented March 30, 1971 3,572,460

HYDROSTATIC STEERING SYSTEM

The invention relates to a hydrostatic-steering system for a vehicle and having at least two motors for the wheels to be steered, in which system fluid under pressure is passed to the motors by way of a metering device in dependence upon the movement of actuating means, e.g. a steering wheel.

Various constructions of hydrostatic-steering systems, for a motor are known. In one arrangement, (U.S. Pat. Re. 25,126), the changeover and cutoff valve is formed on a rotary slide, one sleeve of which is connected to the steering wheel and the other to the rotor of a metering motor. The valve is opened in the required direction by turning the steering wheel. It remains open until so much fluid under pressure has passed through the metering motor to the work motor that the second sleeve follows the rotary movement of the first. In another arrangement (U.S. Pat. No. 2,020,951), the steering wheel is connected to a metering pump. The cutoff and changeover valve opens in the required direction and remains open if and as long as a pressure difference is produced at the valve by the pump. These systems usually also incorporate the feature that, if the pressure pump should fail, the metering device can be manually turned with the help of the steering wheel, and emergency steering can be carried out in this way.

In the case of vehicles used on building sites, for cross-country travel and the like, the front wheels and the back wheels can often be steered, it sometimes being required to steer the front wheels or the rear wheels selectively, or to provide for all-wheel steering or the so-called dog-curve travel. In order also to equip a vehicle of this kind with a hydrostatic-steering system, attempts have been made to arrange the front wheel motor and the rear wheel motor in series, changeover valves being used if necessary, so that the fluid under pressure passing through the metering device flows through both motors one after the other. Here, however, lack of synchronism occurred in the steering movements, since the quantity of fluid under pressure flowing through the second motor was less than that flowing through the first motor, this being due to the losses due to leakage occurring in the first motor. Furthermore, any mechanical impacts on the front wheels were converted through the hydraulic transmission path into relatively severe shock pressures on the rear wheels. Also, a pump was required that could produce a relatively high pressure in order to provide a sufficient pressure-head for the two series-arranged motors.

The object of the invention is to provide a hydrostatic-steering system for a vehicle and having at least two motors for the wheels to be steered, in which system the above-detailed disadvantages are largely avoided and in which, in particular, a high degree of synchronism of the two steering motors can be achieved.

According to the invention, this object is achieved by arranging the motors in parallel, dividing the fluid under pressure that flows through the metering device into at least two equal streams by means of a quantity-divider, and allotting each divisional stream to a motor.

The quantity-divider provides for an accurately predetermined fraction of the fluid under pressure, that flows through the metering device, being available for each motor. The parallel-arranged motors are therefore extremely well synchronized. The entire system can be designed for normal pressure, as is usual when only one motor is used.

The division of the fluid under pressure into a plurality of like streams takes place however not only when the parallel-arranged motors are all operating, but also when one or more motors are switched off. Thus, at least one motor can be supplied with fluid under pressure by way of a valve which, in a first position, has a bypass bridging the motor. This has the advantage that the adjusting movements of the motors in dependence upon the deflection of the steering wheel are always the same irrespective of the number of motors operating.

In the case of a vehicle in which one motor is provided for steering the two front wheels and another for steering the two rear wheels, it is of advantage to allot a valve having a bypass to the two motors. The vehicle can then be steered by the front wheels alone, by the rear wheels alone, or by both pairs of wheels. If one pair of wheels is first brought to the end position and then the other pair of wheels, a symmetrical starting position is achieved in a simple manner.

It is particularly advantageous if in addition to the first position, the front wheel valve has only one second position, establishing connection of the pipe with the motor, and the rear wheel valve, in addition to these two positions, also has a third position in which the pipe connection to the motor is reversed relatively to the second position. The rear wheel valve then enables the all-wheel steering to be changed over to dog-curve steering, the relationship of the steering wheel movement to the adjusting movement of the front wheels being maintained however.

In a preferred arrangement, the quantity-divider consists of at least two coupled similar rotary-piston machines, i.e. of the known gear-type flow-dividers. Instead of these, flow-dividing valves can be used.

The invention will now be described in more detail by reference to an embodiment illustrated in the drawing, in which.

Figure 1:
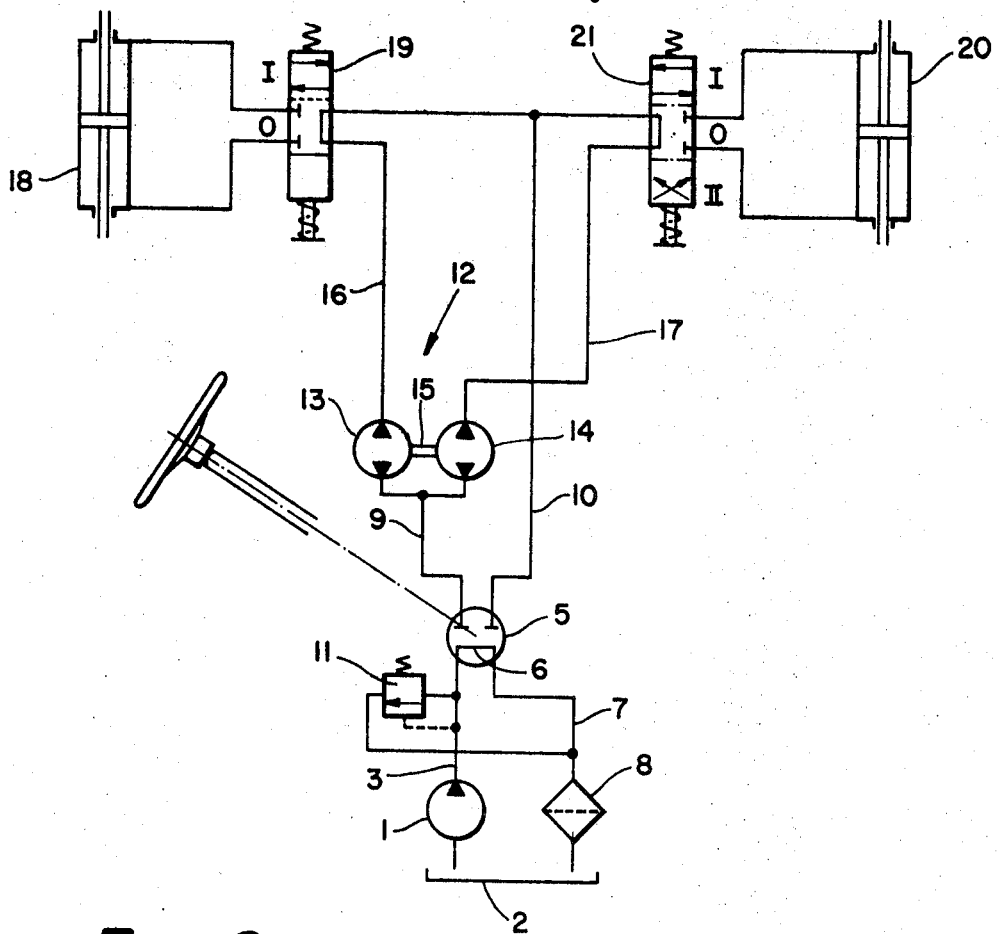
FIG. 1 is a schematic illustration of a hydrostatic-steering system.

The hydrostatic-steering system comprises a pump 1, which delivers oil from a sump 2, through a pressure-pipe 3, to a control means 5 actuated by a steering wheel 4. This control means can, for example, be of a design as described in U.S. Pat. Specification No. RE 25,126. In the neutral position of the control means, the oil under pressure is returned through a bypass 6 directly to the discharge pipe 7 and through a filter 8 into the sump 2. In the two working positions, the oil is passed through one of the connecting pipes 9, 10 to the actual working circuit and is returned through the other connecting pipe. Fitted between the pipes 3 and 7 is an excess-pressure safety valve 11. Other regulating and safety components have been omitted for the sake of clarity.

An important component of the control means 5 is a metering device, not shown in detail, through which the whole of the oil flowing through the operating circuit passes. Normally this metering device is positioned in the delivery path of the oil. The metering device provides for the quantity of oil flowing through the control means 5 being proportional to the rotation of the steering wheel 4.

In the connecting pipe 9 there is fitted a quantity-divider 12, which consists of two rotary-piston machines 13, 14, which are rigidly coupled to each other through a shaft 15. Consequently, the same quantity of oil under pressure flows through the two branches 16 and 17 of the connecting pipe 9.

A first motor 18 is provided for the front-wheel steering. Associated therewith is a valve 19. A second motor 20 is provided for the rear-wheel steering. Associated with this is a valve 21. The two valves 19 and 21 have a first position 0, in which there exists a direct bypass connection between the branch pipes 16 and 17 and the connecting pipe 10. The valve 19 has a second position I, in which the two chambers in the motor 18 are connected to the branch pipe 16 and the connecting pipe 10. Depending upon the rotation of the steering wheel 14, the piston of the motor 18 is therefore moved in one or other direction. The valve 21 has a similar second position I, in which the branch pipe 17 and the connecting pipe 10 are connected to the two cylinder chambers of the motor 20. A third position II is also present however in which the cylinder chambers are transposed relatively to the pipes 17 and 10.

Figure 2:
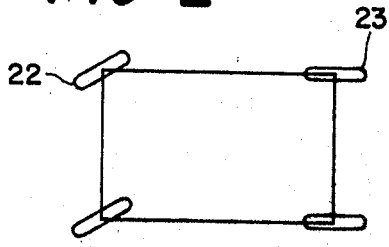
FIG. 2 shows schematically a vehicle with front-wheel steering.

The following types of operation therefore result:

For steering the front wheels 22 (FIG. 2) only valve 19 is brought into the first position I.

Figure 3:
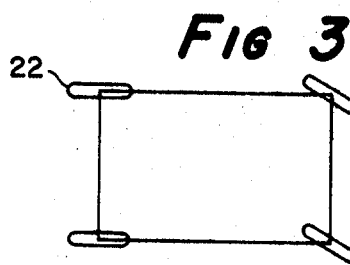
FIG. 3 shows the same vehicle with rear-wheel steering.

For steering the rear wheels 23 (FIG. 3) only the valve 21 is brought into position I.

Figure 4:
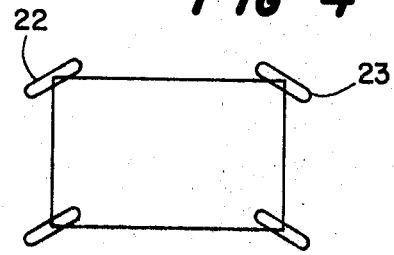
FIG. 4 illustrates the same vehicle with all-wheel steering.

For all-wheel steering (FIG. 4) the two valves 19 and 21 are brought into position I.

Figure 5:
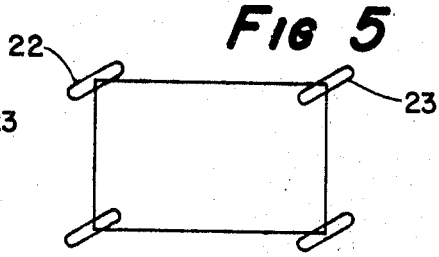
FIG. 5 illustrates the same vehicle with dog-curve steering.

For dog-curve steering (FIG. 5) the valve 19 is brought into position I and valve 21 into position II.

In all cases provision is made for a predetermined deflection of the steering wheel to cause a certain displacement of the wheels to be steered, irrespectively of whether only one or both of the motors 18, 20 are switched on.

The principle of the invention can also be applied to vehicles which have more than two pairs of steered wheels or in which a cylinder is associated with each individual wheel. In the last-named case an interlocking switching system must provide for the associated wheels executing related movements. This step can be also carried out with the help of quantity-dividers. In many cases it is expedient for the returning oil, available to an unused motor, not to be returned to the sump 2 by way of the control means 5, but to be returned directly to the sump with the help of a special valve arrangement. It is particularly advantageous if the valves 19 and 21 take the form of multiway ballcocks, the leakage-losses of which can be kept extremely small.

The valve positions illustrated naturally only apply in the case of a given steering movement system, particularly track rods positioned between the front and rear axles. In the case of other types of system, the valve positions can be changed.

I claim:

1. A hydrostatic-steering system for controlling the front and rear wheels of a vehicle comprising at least two motors, a steering wheel-controlled metering control device having inlet and outlet ports and two motor ports, each of said motor ports being selectable as a pressure or exhaust port as determined by a steering wheel control of said control device, a fluid stream quantity divider connected to one of said motor ports, a first set of parallel conduits extending from said divider to said motors, a second set of parallel conduits connected to said motors, and a single conduit connecting said second set of parallel conduits to the other one of said motor ports.

2. A hydrostatic-steering system according to claim 1 having first valve means for one of said motors which has connections with one conduit in each of said sets of conduits, said first valve means having a bypass position bridging said one of said motors.

3. A hydrostatic-steering system according to claim 2 having second valve means for the other one of said motors, said second valve means having connections with one conduit in each of said sets of conduits, said second valve means having a bypass position bridging said other one of said motors.

4. A hydrostatic-steering system according to claim 3 in which one of said valve means has two operating positions with one of said operating positions effecting operation of the associated motor in one direction and the other of said operating positions effecting operation of the associated motor in the other direction.

5. A hydrostatic-steering system according to claim 1 in which said quantity divider comprises two similar rotary piston gear devices coupled together.